United States Patent [19]

Kakimoto

[11] 4,437,653
[45] Mar. 20, 1984

[54] FLUID-FILLED ENGINE MOUNT DEVICE

[75] Inventor: Toshihiko Kakimoto, Tokyo, Japan

[73] Assignee: Nissan Motor Company, Ltd., Yokohama, Japan

[21] Appl. No.: 348,836

[22] Filed: Feb. 16, 1982

[30] Foreign Application Priority Data

Feb. 17, 1981 [JP] Japan .................................. 56-21664

[51] Int. Cl.³ .............................................. F16F 5/00
[52] U.S. Cl. ................................................. 267/140.1
[58] Field of Search ............................. 280/562, 636; 267/140.1, 141, 141.1, 141.2, 141.3, 141.4, 141.5

[56] References Cited

U.S. PATENT DOCUMENTS

| | | | |
|---|---|---|---|
| 2,387,066 | 10/1945 | Harding et al. | 248/358 |
| 2,890,846 | 6/1959 | Schloss | 267/141.4 |
| 4,159,091 | 6/1976 | Le Salver et al. | 248/562 |

FOREIGN PATENT DOCUMENTS

| | | |
|---|---|---|
| 0042910 | 1/1982 | Fed. Rep. of Germany. |
| 2802896 | 7/1979 | Fed. Rep. of Germany. |
| 2833776 | 1/1980 | Fed. Rep. of Germany. |
| 2906282 | 8/1980 | Fed. Rep. of Germany ... 267/140.1 |
| 2906282 | 8/1980 | Fed. Rep. of Germany. |
| 2041488 | 9/1980 | United Kingdom. |
| 2041485 | 9/1980 | United Kingdom. |
| 2074962 | 11/1981 | United Kingdom. |

*Primary Examiner*—Duane A. Reger
*Attorney, Agent, or Firm*—Schwartz, Jeffery, Schwaab, Mack, Blumenthal & Koch

[57] ABSTRACT

A fluid-filled engine mount device comprises first and second base plate members which are connected to a power unit side and a vehicle body side, respectively; a block made of elastic material and interposed between the first and second base plate members, the elastic block being formed with a cavity; a partition plate member having an orifice, located in the vicinity of and spaced from the first base plate member to define a fluid chamber to be filled with a fluid and an auxiliary chamber which communicates with the fluid chamber through the orifice; and an elastic support member for connecting the partition plate member with the first base plate member, includes a secured section secured to the first base plate member, and an annular section located inside of the inner wall surface of the elastic block cavity and inside of the first base plate member in the radial direction, and located between the secured section and the partition plate member peripheral section, thereby effectively preventing high frequency vibration from being transmitted to the vehicle body side, achieving an effective damping of total vibrations applied to the engine mount.

8 Claims, 11 Drawing Figures

4,437,653

FLUID-FILLED ENGINE MOUNT DEVICE

BACKGROUND OF THE INVENTION

1. Field of the Invention

This invention relates to an engine mount device through which a power unit is mounted on a support body, and more particularly to an engine mount device of the fluid-filled type for elastically supporting an automotive internal combustion engine on a vehicle body.

2. Description of the Prior Art

It is well known in the art that fluid-filled engine mount devices are used to elastically support an automotive internal combustion engine on a vehicle body. The engine mount device is composed of a rubber block which is formed with a central cavity and securely interposed between upper and lower base plate members which are respectively connected to the engine side and to the vehicle body side. A partition plate member having an orifice is disposed to define a fluid chamber to be filled with a fluid and an auxiliary chamber which communicates through the orifice with the fluid chamber, so that the fluid is capable of flowing from the fluid chamber to the auxiliary chamber and vice versa in response to the contraction and expansion of the rubber block.

Additionally, in such an engine mount device, it has been proposed that the partition plate member is arranged to be movable to absorb high frequency vibration applied from the engine to the engine mount device. However, even by the thus arranged engine mount device, it is difficult to effectively absorb the high frequency vibration, for example, during vehicle cruising where both high and low frequency vibrations are applied to the engine mount device. Because, the fluid movement due to the low frequency vibration urges the partition plate member to contact with the upper base plate member and its vicinity, so that the high frequency vibration applied the engine mount device is transmitted via the partition plate member to the vehicle body side.

BRIEF SUMMARY OF THE INVENTION

In accordance with the present invention, a fluid-filled engine mount device comprises first and second base plate members which are spaced from each other and connected to a power unit side and a vehicle body side, respectively. A block made of elastic material is interposed between the first and second base plate members and is formed with a cavity. A partition plate member is located in the vicinity of and spaced from the first base plate member. The partition plate member defines a fluid chamber on the elastic block cavity side and an auxiliary chamber on the opposite side relative to the fluid chamber, which auxiliary chamber is also defined by a diaphragm member connected to the first base plate member. The partition plate member is formed with an orifice through which the fluid chamber is in communication with the auxiliary chamber. The fluid chamber and at least a part of the auxiliary chamber are filled with a fluid. An elastic support member for connecting the partition plate member with the first base plate member includes a secured section through which the elastic support member is secured to the first base plate member, and a generally annular section located inside of the inner wall surface of the elastic block cavity and of the first base plate member in the radial direction. The annular section is located between the secured section and the peripheral section of said partition plate member.

With the thus arranged engine mount device, the partition plate member is completely prevented from contacting with the first base plate member and its rigid vicinity even during low frequency vibration input. This effectively prevents high frequency vibration applied to the engine mount device from being transmitted to the vehicle body side, thereby effectively absorbing total vibrations applied to the engine mount device.

BRIEF DESCRIPTION OF THE DRAWINGS

The features and advantages of the fluid-filled engine mount device according to the present invention will be more clearly appreciated from the following description taken in conjunction with the accompanying drawings in which like reference numerals designate like parts and elements, and in which.

DETAILED DESCRIPTION OF THE INVENTION

Figure 1:
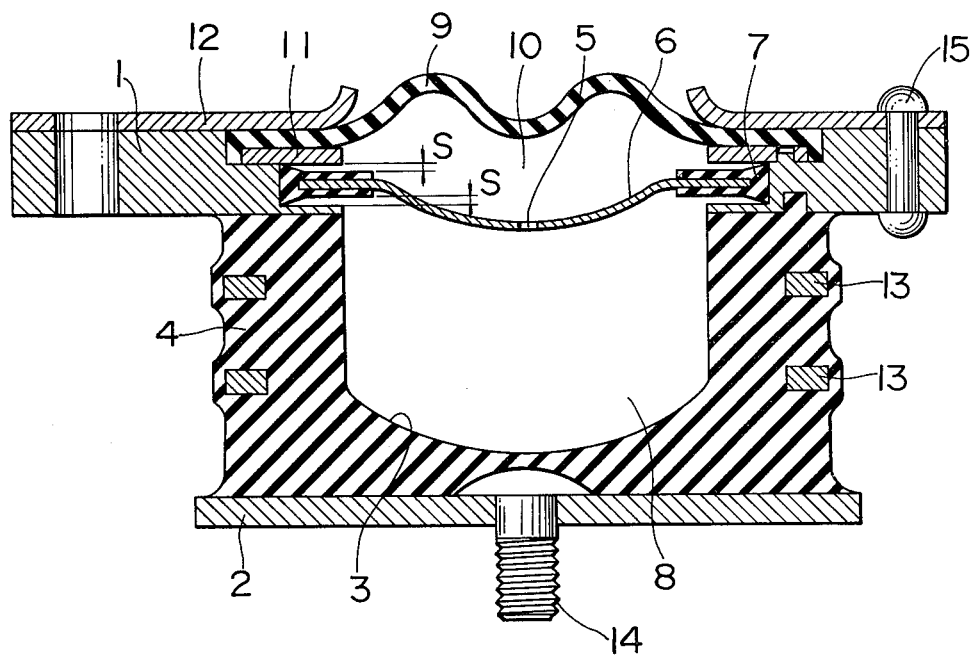
FIG. 1 is a vertical sectional view of the conventional engine mount device.

To facilitate understanding the present invention, a brief reference will be made to a conventional fluid-filled engine mount device, depicted in FIG. 1. Referring to FIG. 1, the conventional engine mount device includes an upper base plate member 1 connected to a power unit side and a lower base plate member 2 connected to a vehicle body frame side. A rubber block 4 is securely interposed between the first and second base plate members 1, 2 and formed with a cavity 3 therein-side. A partition plate member 6 is located at the upper part of the cavity 3 and supported by a support rubber 7 which is secured to the upper base plate member 1. The partition plate member 6 is formed with an orifice 5 and defines a fluid chamber 8 on its inner side and an auxiliary chamber 10 on its above side. The auxiliary chamber 10 is further defined by a diaphragm member 9 which is securely connected to the upper base plate member 1. The auxiliary chamber 10 communicates through the orifice 5 with the fluid chamber 8. The peripheral section of the diaphragm member 9 is secured between a frame plate member 11 and a vertical wall portion of the upper base plate member 1 by fixing a pressure plate 12 onto the upper base plate member 1 by means of rivets 15 or the like. As shown, clearance S is formed between the support rubber 7 and each of a flat portion of the upper base plate member 1 and the frame plate member 11, so that the partition plate member 6 is movable upward anmd downward by the distance corresponding to the clearance S. Additionally rigid rings 13 are embedded in the rubber block 4 at its peripheral section in order to prevent the inflation of the rubber block 4 in its radial direction. The fluid and auxiliary chambers 8, 10 are filled with a fluid which can flow between the fluid and auxiliary chambers through the partition plate member orifice 5. The reference numeral 14 designates a bolt for securing the lower base plate member 2 onto a vehicle body frame or the like.

With the thus arranged conventional fluid-filled engine mount device, when vibration is applied onto the engine mount device, the rubber block 4 expands and contracts in the upward and downward direction. In case where the applied vibration is of high frequency and fine, the vibration wave form becomes that shown in FIG. 2B in which the vibration amplitude is smaller, so that the expansion and contraction amount of the rubber block 4 is smaller, in which the pressure variation within the fluid chamber 8 is less. At this time, the partition plate member 6 moves upward and downward by the distance corresponding to the above-mentioned clearance S, but fluid movement is not made between the fluid and auxiliary chambers 8, 10 through the partition plate member orifice 5. Accordingly, high-frequency and fine vibration is absorbed by the elastic deformation of the rubber block 4.

Figure 2A:
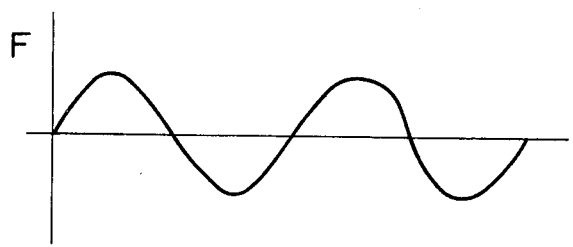
FIGS. 2A and 2B are the wave forms of vibrations generated in an automotive vehicle.

In case where the applied vibration is of low frequency as by the bound of a vehicle body, the vibration wave form becomes that shown in FIG. 2A, so that the pressure variation within the fluid chamber 8 cannot be absorbed by the mere movement of the partition plate member 6 within the clearance S. Therefore, fluid movement takes place between the fluid and auxiliary chamber 8, 10 through the partition plate member orifice 5, in which the applied vibration can be damped by flow resistance of the fluid during the fluid passage through the partition plate member orifice 5. Additionally, the support rubber 7 prevents the partition plate member 6 from directly contacting with the frame plate member 11 and the upper base plate member 1 during the movement of the partition plate member 6.

However, in such a conventional engine mount device, it is necessary to limit the movable range of the partition plate member 6 by setting the above-mentioned clearance S. Because, if the partition plate member 6 largely moves, the amount of the fluid passing through the partition plate member orifice 5 is less during low frequency vibration input, thereby decreasing the vibration damping effect by the partition plate member orifice 5. Furthermore, it is also necessary to reduce the deflection of the rubber block 4 in the inward and outward direction.

Figure 2B:
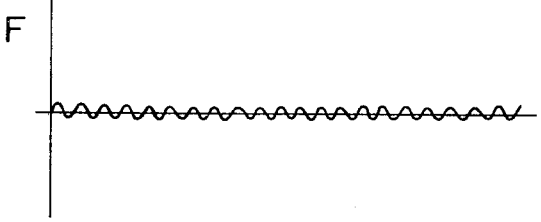
Figure 2C:
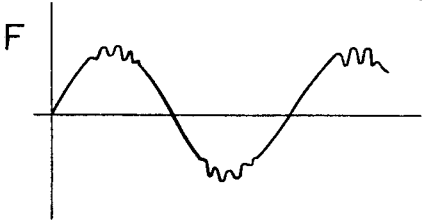
FIGS 2C and 2D are the wave forms of vibrations applied to engine mount devices.
Figure 2D:
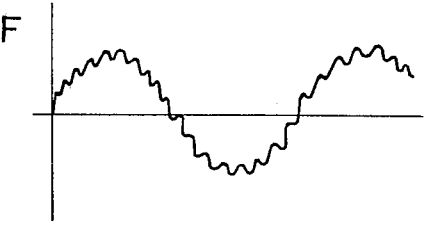

When an engine merely runs maintaining the vehicle standstill, for example, during engine idling condition, high frequency and fine vibration can be absorbed as discussed hereinbefore. However, during vehicle cruising, both low frequency vibration shown in FIG. 2A and high frequency vibration shown in FIG. 2B are simultaneously applied to the engine mount device, so that the applied vibration has the wave form shown in FIG. 2D which is formed by combining the wave forms of FIGS. 2A and 2B. As a result, high frequency vibration is transmitted to the vehicle body side always when the partition plate member 6 moves at the clearance S to contact with the upper base plate member 1 and the frame plate member 11, so that the wave form of the vibration applied to the vehicle body side becomes that shown in FIG. 2C. Besides, hum sound due to the fine vibration shown in FIG. 2C is periodically generated within a passenger compartment, which is very uncomfortable. Furthermore, during acceleration and deceleration or during starting and braking of the vehicle, the partition plate member 6 always contacts the upper base plate member 1 and the frame plate member 11, and therefore both the high frequency fine vibration and the low frequency vibration are transmitted to the vehicle body.

Figure 3:
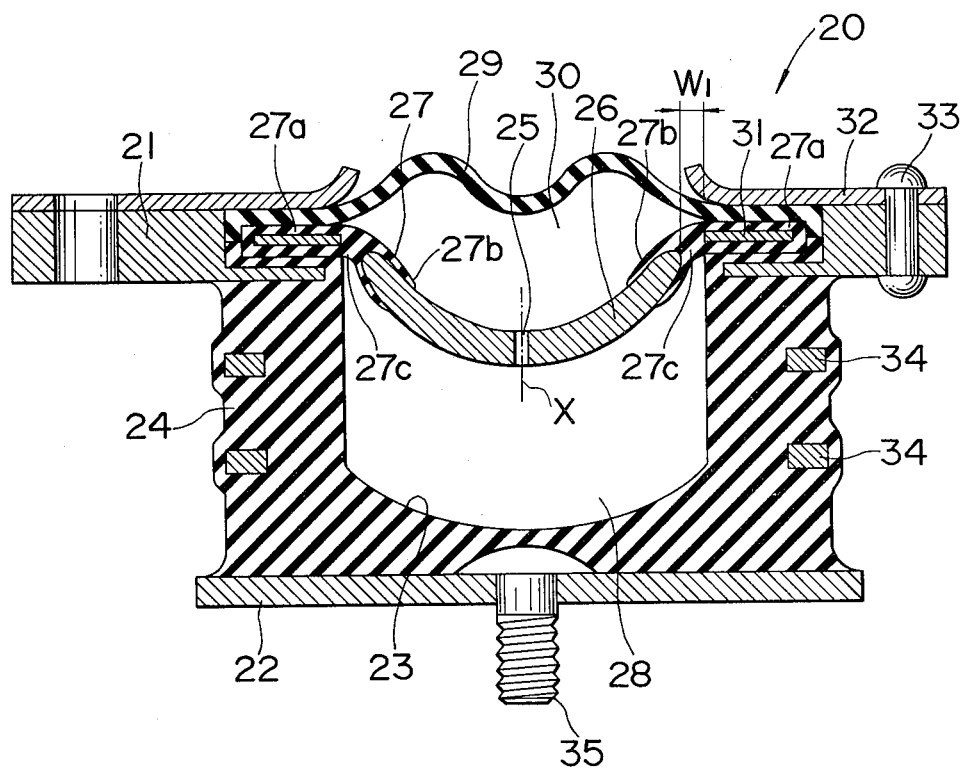
FIG. 3 is a vertical sectional view of a preferred embodiment of a fluid-filled engine mount device in accordance with the present invention.

In view of the above description of the conventional engine mount device, reference is now made to FIG. 3, wherein a preferred embodiment of a fluid-filled engine mount device of the present invention is illustrated by the reference numeral 20. The engine mount device 20 comprises an upper or first base plate member 21 and a lower or second base plate member 22 which are disposed spaced from each other. The upper base plate member 22 is connected to a power unit (or an internal combustion engine) side, whereas the lower base plate member 22 is connected to a vehicle body side such as an automotive vehicle body frame.

A block 24, made of elastic or elastomeric material such as rubber, is interposed between the upper and lower base plate members 21, 22 so as to be securely connected to both the base plate members, maintaining fluid-tight seal. The elastic block 24 is generally cup-shaped and therefore is formed with a central cavity or hollow 23 thereinside. A partition plate member 26 is movably disposed at the upper part of the elastic block cavity 23, and is formed at its central portion with an orifice 25. The partition plate member 26 is secured to a support member 27 made of an elastic or elastomeric material such as rubber. The elastic support member 27 includes a secured section 27a through which the elastic support member 27 is securely connected to the upper base plate member 21 through the top section of the elastic block 24 and the peripheral section of a diaphragm member 29. The secured section 27a is integral through an annular intermediate section 27c with a support section 27b for supporting the partition plate member 26. The annular intermediate section 27c has a width $W_1$ corresponding to the distance between the periphery of the partition plate member 26 and a rigid core material or member 31 embedded in the secured station 27a of the elastic support member 27. The partition plate member 26 and the core material 31 are secured to the elastic support member 27, for example, by means of vulcanization adhesion. The diaphragm member 29 is pressed at its peripheral section by a pressure plate 32 secured onto the upper base plate member 1 by means of rivets 33 or the like, so that the elastic support member secured section 27a is fixedly sandwiched in between the diaphragm member peripheral section and the elastic block top section in order to secure the elastic support member 27 to the upper base plate member 21.

The partition plate member 26 defines a fluid chamber 28 between its lower surface and the inner wall surface of the elastic block cavity 23. Additionally, an auxiliary chamber 30 is defined between the upper surface of the partition plate member 27 and the diaphragm member 29. The auxiliary chamber 30 communicates with the fluid chamber 28 through the partition plate member orifice 25. The fluid chamber 28 and at least a part of the auxiliary chamber 30 are filled with a fluid such as a liquid, so that the fluid can move from fluid chamber 28 to the auxiliary chamber 30 and vice versa.

The partition plate member 26 is made of metal and its thickness is relatively large to obtain a relatively heavy weight. The partition plate member 26 and the elastic support member annular intermediate section 27c constitutes a system whose natural or characteristic frequency (f) is set at a value expressed by the following equation:

$$f = \frac{1}{2\pi} \sqrt{\frac{Kg}{W}} < 400 \text{ Hz}$$

where, "f" is the natural frequency of the system constituted by the partition plate member 26 and the elastic support member annular intermediate section 27c; "k" is the spring contat of the annular intermediate section 27c in the direction of the axis (indicated by a dot-dash line X) of the partition plate member 26; "w" is the weight of the partition plate member 26; and "g" is gravitational acceleration.

The reference numerals 13 designate rigid rings embedded in the elastic block 24 in the vicinity of the outer peripheral surface, in order to prevent the elastic block 24 from inflating in the radial direction thereof. The reference numeral 35 designates a bolt for securely connecting the lower base plate member 22 with the vehicle body frame or the like.

The manner of operation of the thus arranged engine mount device of the present invention will be discussed hereinafter.

When vibration is applied to the engine mount device 20, the elastic block 24 expands and contracts in the upward and downward direction. In case where the vibration is of low frequency as during bound and rebound of the vehicle body, fluid movement takes place between the fluid chamber 28 and the auxiliary chamber 30, in which the applied vibration is damped by virtue of the flow resistance of the fluid passing through the partition plate member orifice 25. During the above-mentioned expansion and contraction of the elastic block 24, the partition plate member 26 slightly moves upward and downward with deformation of the elstic support member annular intermediate section 27c in response to the fluid pressure variation within the fluid chamber 28 and the auxiliary chamber 30.

In case where the applied vibration is of high frequency and fine as from the power unit, the vibration amplitude is smaller and therefore the expansion and contraction amount of the elastic block 24 is less, thereby reducing the pressure variation within the fluid chamber 28. Since the natural frequency of the system constituted by the partition plate member 26 and the elastic support member annular intermediate section 27c is set at the value less than 400 Hz and the applied high frequency fine vibration has a frequency higher than the natural frequency, the movement phase of the partition plate member 26 becomes reverse relative to that of the upper base plate member 21. Accordingly, the volume change of the fluid chamber 28 due to the deformation of the elastic block 24 caused by the vibration of the base plate member 21 is nearly offset by the volume change of the fluid chamber 28 due to the vibration of the partition plate member 26, so that substantially no volume change is made in the fluid chamber 28. Moreover, as the frequency, higher than the natural frequency, of the vibration applied to the upper base plate member 21 increases, the vibration amplitude of the partition plate member 26 decreases. This suppresses the pressure wave generated within the fluid chamber 28 due to the frequency increase of the applied vibration.

At a range where the frequency of the applied vibration is considerably high, the vibration amplitude of the partition plate member 26 is much smaller, thereby leaving a slight vibration damping effect due to the volume change of the fluid chamber 28 caused by the inward deformation of the elastic block 24 upon receiving the vibration from the power unit. It will seem that the flow rate of the fluid passing through the partition plate member orifice 25 increases as the vibration frequency increases, thereby raising the vibration damping effect. However, in fact, the outward deformation of the elastic block 24 increases and therefore the vibration damping effect is less. Thus, almost all the high frequency and fine vibration applied to the engine mount device 20 can be absorbed by the expansion and contraction of the elastic block 24.

Figure 4:
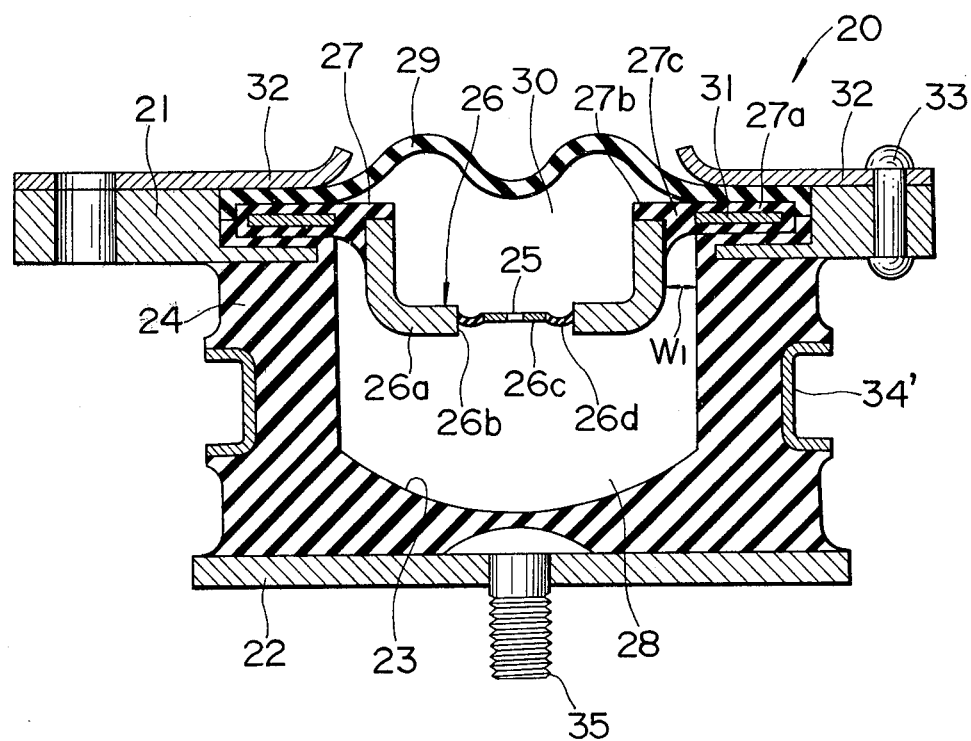
FIG. 4 is a vertical sectional view of another embodiment of the fluid-filled engine mount device in accordance with the present invention.

FIG. 4 illustrates another embodiment of the engine mount device 20 in accordance with the present invention. In this embodiment, the partition plate member 26 is generally cup-shaped and includes a main body 26a which is formed at its central section with an opening 26b. Additionally, a disc plate 26c is disposed in the opening 26b and is elastically supported through an annular rubber member 26d to the main body 26a. The disc plate 26c is formed at its central portion with the orifice 25 through which the fluid chamber 28 communicates with the auxiliary chamber 30. In this embodiment, a wide rigid ring 34' is used in place of the rings 34 in FIG. 3 embodiment. It will be understood that the natural frequency of the system constituted by the partition plate member 26 and the elastic support member annular intermediate section 27c is set at the value less than 400 Hz also in this embodiment.

In order to further increase the damping effect on low frequency vibration, it appears effective to increase the rigidity of the elastic support member annular intermediate section 27c and additionally to decrease the radially outward inflation of the elastic block 24 thereby to increase the amount of the fluid passing through the disc plate orifice 25. However, such an increase in the rigidity of the elastic support member annular intermediate section 27c necessitates an increase in the weight of the partition plate member 26. This weight increase should be avoided from a standpoint of advantageous vehicle weight lightening.

According to this embodiment, the above-discussed problem is solved as follows: To reduce the vibration amplitude of the partition plate member 26 within a vibration frequency range where pressure wave largely affect, the natural frequency of the system constituted by the partition plate member 26 and the elastic support member annular intermediate section 27c is set at a value which is sufficiently low as compared with the above vibration frequency range, thereby removing the vibration damping effect due to the volume change in the fluid chamber 28 caused by the vibration of the partition plate member 26 which vibration is on the same phase as that of the upper base plate member 21.

This is accomplished by employing the above-mentioned arrangement in which the disc plate 26c having the orifice 25 is supported through the annular rubber member 26d by a part of the partition plate member 26 so that the disc plate 26c is movable upward or downward.

It will be noted that it is sufficient that the annular rubber member 26d is smaller, because the volume change of the fluid chamber 28 due to the high frequency and fine vibration applied from the power unit side is smaller. In general, vibration damping effect or force is in inverse proportion to a squared orifice area. Consequently, if the area of the disc plate 26c is 10 times the area of the orifice 25, the vibration damping force becomes 1/100 times, so that the vibration damping effect by the orifice 25 is nearly negligible. Therefore, almost no damping action is accomplished by the orifice 25 during high frequency and fine vibration input.

Low frequency vibration has the vibration amplitude larger than that of the above-mentioned high frequency and fine vibration, so that the volume change amount of the fluid chamber 28 is 10–20 times that due to the high frequency and fine vibration, thereby increasing the displacement amount of the disc plate 26c. However, the volume change rate of the fluid chamber 28 is lower and therefore the fluid flows through the orifice 25 to establish fluid movement between the fluid chamber 28 and the auxiliary chamber 30. As a result, no problem arises in the arrangement using the disc plate 6c and the annular rubber member 6d, even during low frequency vibration input.

Figure 6A:
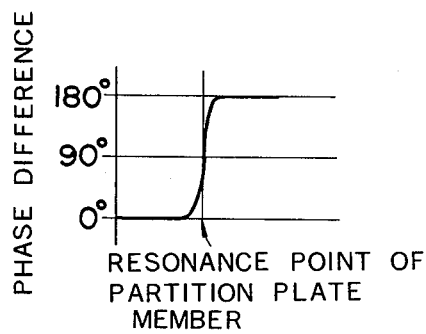
FIG. 6A is a graph showing the phase difference in vibration wave shape of the partition plate member of the engine mount device of FIG. 4 relative to the base plate member of the same.
Figure 6B:
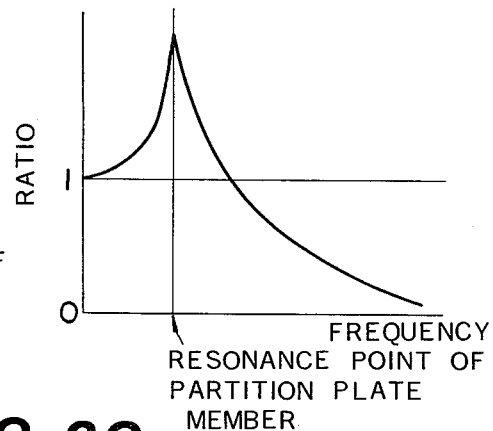
FIG. 6B is a graph showing the amplitude ratio of the partition plate member of FIG. 4 relative to the base plate member.
Figure 6C:
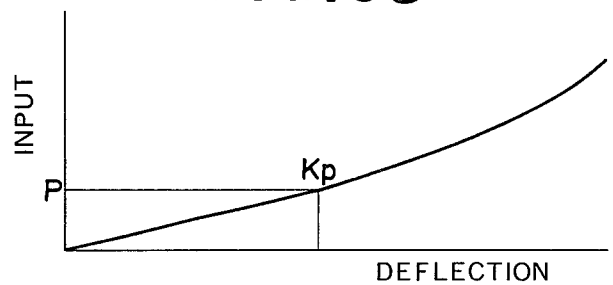
FIG. 6C is a graph showing the relationship between vibration input and the deflection of the annular intermediate section of the elastic support member of the engine mount device of FIG. 4.

Hence, it is enough that the rigidity of the annular rubber member 26d is smaller in the direction parallel with the axis of the partition plate member 26, by which almost all high frequency and fine vibration can be absorbed even if low frequency vibration input and vibration variation input act simultaneously with high frequency and fine vibration input on the engine mount device 20. In this regard, FIG. 6C shows the relationship between the vibration input variation and the deflection amount of the annular rubber member 26d, in which when the vibration input is "p," the rigidity of the annular rubber member 26d becomes "kp." Additionally, FIG. 6A shows the phase difference in vibration wave shape of the partition plate member 26 relative to the upper base plate member 21. FIG. 6B shows the ratio in amplitude of the partition plate member 26 relative to the upper base plate member 21. During high frequency and fine vibration input, the partition plate member 26 is higher in force of inertia and the annular rubber member 26d deflects, so that the vibration amplitude of the partition plate member 26 is smaller. As a result, nearly no pressure wave is generated within the fluid chamber 28.

Figure 5:
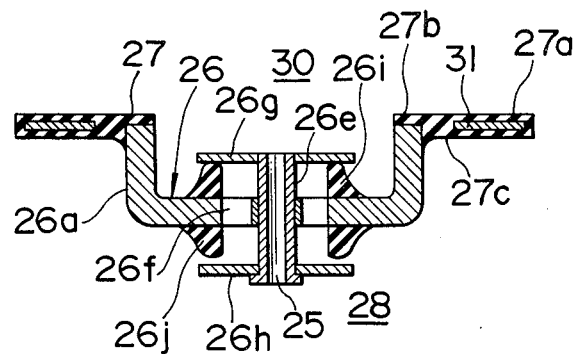
FIG. 5 is a vertical sectional view of an essential part of a further embodiment of the engine mount device in accordance with the present invention.

FIG. 5 illustrates a further embodiment of the engine mount device in accordance with the present invention, which is similar to FIG. 4 embodiment except the construction of the partition plate member 26. In this embodiment, the main body 26a of the partition plate member 26 is provided at its central portion with a cylindrical member 26e which is vertically and slidably disposed along the axis of the partition plate member 6. The cylindrical member 26e is formed with an axial bore or the orifice 25. The main body 26a is formed with openings 26f which are located around the cylindrical member 26e. Upper and lower movable plates 26g, 26h are respectively secured to the opposite end portions of the cylindrical member 26e in such a manner that the axis of the cylindrical member 26e is perpendicular to the movable plates. As shown, the two movable plates 26g, 26h are located at the opposite sides with respect to the main body 26a. A generally cylindrical upper rubber projection is securely disposed on the upper side surface of the main body 26a and projects upward so that the upper movable plate 26g is contactable with the rubber projection to maintain fluid-tight seal. A generally cylindrical lower rubber projection 26j is disposed on the lower side surface of the main body 26a and projects downward so that the lower movable plate 26h is contactable with the lower rubber projection 26j to maintain fluid-tight seal.

With this arrangement of the engine mount device, the open-and-close action between the upper movable plate 26g and the upper rubber projection 26i and that between the lower movable plate 26h and the lower rubber projection 26f alternately take place in response to the pressure variation within the fluid chamber 28. This allows the fluid movement in a small amount between the fluid chamber 28 and the auxiliary chamber 30, which causes a vibration damping effect during high frequency and fine vibration input, thereby absorbing the high frequency and fine vibration only by the expansion and contraction of the elastic block 24. Besides, since the area of the openings 26f is smaller and the close action takes plate between the movable plate 26g, 26h and the rubber projection 26i, 26j, almost all fluid movement between the fluid chamber 28 and the auxiliary chamber 30 is accomplished through the orifice 25, so that the vibration damping effect due to the orifice 25 is sufficiently obtained. Accordingly, a lower rigidity is sufficient for the rubber projections 26i, 26j, and besides the rubber projections serve to prevent high frequency and fine vibration from being transmitted to the vehicle body side under various engine operating ranges. Moreover, it is preferable that the partition plate member main body 26a is made of lead or lead alloy which is heavier in weight, in order to render the main body 26a small-sized. It will be understood that, also in FIG. 5 embodiment, the natural frequency of the system constituted by the partition plate member 26 and the elastic support member annular intermediate section 27c is set at a value less than 400 Hz.

As appreciated from the above, according to the present invention, the partition plate member is elastically connected to the upper base plate member through the elastic support member in such a manner that the partition plate member never contact the upper base plate member even when moved. This effectively prevents high frequency vibration from being transmitted from the power unit side to the vehicle body side even under the action of low frequency vibration, thereby suppressing the generation of hum noise within the passenger compartment. By virtue of this arrangement, the construction of a section where the partition plate member is connected to the base plate member becomes simpler. Besides, since it becomes unnecessary to form a clearance for allowing the movement of the partition plate member between the base plate member and the partition plate member, the assembly process can be simplified and it becomes possible to obtain the products having uniform characteristics.

Furthermore, by suitably selecting the construction and weight of the partition plate member and by limiting the natural frequency of the system constituted by the partition plate member and the elastic support member annular intermediate section within a range less than 400 Hz, high frequency and fine vibration from the power unit side can be further effectively damped by the following mechanism: The vibration phase of the partition plate member can be reversed relative to that of the base plate member vibrated by high frequency and fine vibration from the power unit or the like. Accordingly, the volume changes due to the vibration of the base plate member and due to the vibration of the partition plate member are offset by each other, thereby effectively absorbing the applied high frequency and fine vibration by the expansion and contraction of the elastic block.

What is claimed is:

1. A fluid-filled engine mount device comprising:
   first and second base plate members which are spaced from each other and connected to a power unit side and a vehicle body side, respectively;
   a block made of elastic material, interposed between said first and second base plate members and being formed with a cavity;
   a partition plate member located in the vicinity of and spaced from said first base plate member, said partition plate member defining a fluid chamber on the elastic block cavity side and an auxiliary chamber on the opposite side relative to said fluid chamber, said auxiliary chamber being defined by a diaphragm member connected to said first base plate member, said partition plate member being formed with an orifice through which said fluid chamber is in communication with said auxiliary chamber, said fluid chamber and at least a part of said auxiliary chamber being filled with a fluid; and
   an elastic support member for connecting said partition plate member with said first base plate member, said elastic support member including a secured section through which said elastic support member is secured to said first base plate member, and a generally annular section located inside of the inner wall surface of said elastic block cavity and inside of said first base plate member in the radial direction, and located between said secured section and the peripheral section of said partition plate member.

2. A fluid-filled engine mount device as claimed in claim 1, said partition plate member and said elastic support member annular section constitute a system whose natural frequency is set at a value expressed by the following equation:

$$f = \frac{1}{2\pi} \sqrt{\frac{Kg}{W}} < 400 \text{ Hz}$$

where, "k" is the spring constant of said elastic support member annular section in the direction parallel with the axis of said partition plate member; "w" is the weight of said partition plate member; and "g" is gravitational acceleration.

3. A fluid-filled engine mount device as claimed in claim 2, wherein said elastic support member includes a support section to which said partition plate member contacts, said support section being integral with said annular section, and a rigid core member disposed in said secured section, in which said annular section is positioned between said rigid core member and said support section.

4. A fluid-filled engine mount device as claimed in claim 3, wherein said elastic support member secured section is interposed between the peripheral section of said diaphragm member and a part of said elastic block which are in direct contact with said first base plate member.

5. A fluid-filled engine mount device as claimed in claim 4, wherein said partition plate member is made of metal.

6. A fluid-filled engine mount device as claimed in claim 5, wherein said elastic support member is made of rubber.

7. A fluid-filled engine mount device as claimed in claim 2, wherein said partition plate member includes a main body connected to said elastic support member and having an opening located at the central section thereof, a disc plate disposed within said main body opening and spaced from said main body, said disc plate having an opening serving as said orifice, and an annular elastic member connecting said disc plate with said main body.

8. A fluid-filled engine mount device as claimed in claim 2, wherein said partition plate member includes a main body connected to said elastic support member, a cylindrical member slidably disposed at the central portion of said main body and having an axial opening, serving as said orifice, first and second plates secured to the opposite ends of said cylindrical member in such a manner that the axis of said cylindrical member being perpendicular to said first and second plates, means defining openings in said main body around said cylindrical member, first and second elastic cylindrical projections which are respectively secured on the opposite side surfaces of said main body and located outside of said openings, said first cylindrical projection projecting toward said first plate to be contactable with said first plate, said second cylindrical projection projecting toward said second plate to be contactable with said second plate.

* * * * *